(12) United States Patent
Moore

(10) Patent No.: US 6,904,518 B2
(45) Date of Patent: Jun. 7, 2005

(54) FINDING A SIGNIFICANT BIT IN A COMPUTER DATA WORD

(75) Inventor: Stephen F. Moore, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 502 days.

(21) Appl. No.: 10/202,960

(22) Filed: Jul. 25, 2002

(65) Prior Publication Data

US 2004/0019769 A1 Jan. 29, 2004

(51) Int. Cl.⁷ .............................................. G06F 9/305
(52) U.S. Cl. ....................................................... 712/300
(58) Field of Search ................................. 712/224, 300; 708/205, 497

(56) References Cited

U.S. PATENT DOCUMENTS

| 5,841,683 A | * | 11/1998 | Bechade et al. ............ 708/497 |
| 5,920,493 A | * | 7/1999 | Lau ............................. 708/205 |
| 6,172,623 B1 | * | 1/2001 | Norrie et al. ................. 341/59 |
| 6,721,772 B1 | * | 4/2004 | Green et al. ................ 708/497 |

* cited by examiner

Primary Examiner—William M. Treat
(74) Attorney, Agent, or Firm—Trop, Pruner & Hu, P.C.

(57) ABSTRACT

The most or least significant bit of a datum can bet determined using parallel operations. This may result in faster location of the most or least significant bit without necessarily introducing more overhead in some embodiments.

21 Claims, 1 Drawing Sheet

FINDING A SIGNIFICANT BIT IN A COMPUTER DATA WORD

BACKGROUND

This invention relates generally to processor-based systems and, particularly, to systems that need to locate a most or least significant bit of a computer word.

In a number of circumstances, it is desirable to locate the most or least significant bit of a computer word. For example, in various arithmetic operations this may be desirable. In particular, it is useful to know where the most significant bit is located to estimate the quotient for division, as well as in a variety of other situations.

One technique to find a significant bit is to simply look at each bit in order and to stop when the first non-zero bit is found. While this approach is simple, it has a running time proportional to the length of the data.

Alternatively, the most significant bit may be located by treating the datum as an integer and performing a binary search for the least power of two which is greater than the datum. This result can then be used to directly compute the index of the most significant bit. Although this algorithm may reduce the computational complexity to the log of the datum size, the overhead for testing and branching is high.

Thus, there is a need for better ways to locate significant bits.

DETAILED DESCRIPTION

Figure 1:
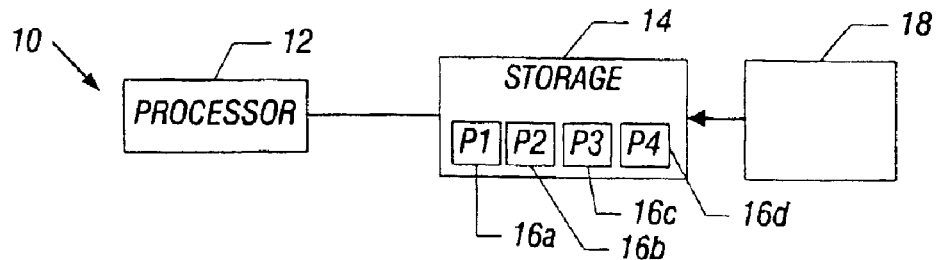
FIG. 1 is a schematic depiction of one embodiment of the present invention.

Referring to FIG. 1, a processor-based system 10 may include a processor 12 coupled to a storage 14. The storage 14 may be any type of device capable of storing data including a semiconductor memory, a rotatable disk storage device, or logic.

The storage 14 may include a plurality of predicate registers 16a–16d. In one embodiment of the present invention, the processor 12 may be capable of implementing parallel operations. A predicate register stores a single binary value.

A software program 18 may be stored on the storage 14 in one embodiment of the present invention. In other embodiments, the program 18 may be stored in a storage different from the storage that includes the predicate registers 16.

Figure 2:
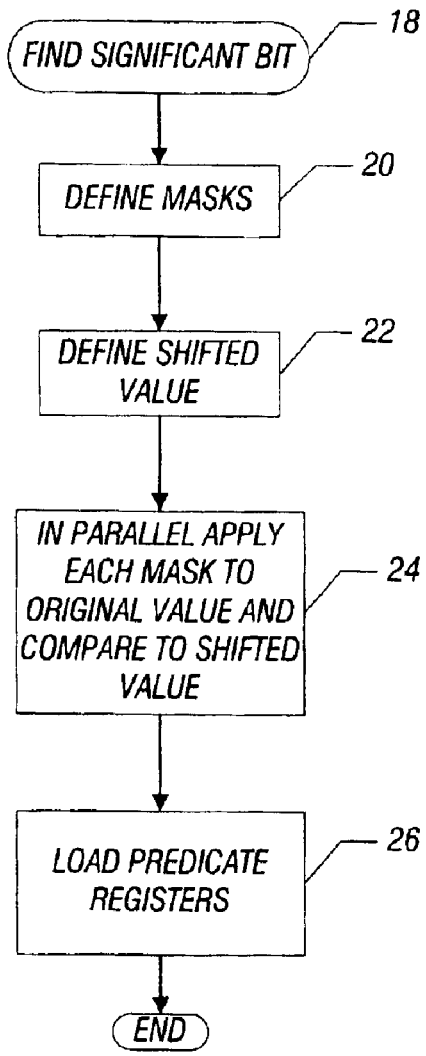
FIG. 2 is a flow chart for one embodiment of the present invention.

The software program 18, shown in FIG. 2, begins by defining a plurality of masks as indicated in block 20. The first mask has alternate bits set to one. A second mask has every other pair of bits set to one. The next mask has every other group of four bits set to one. The next mask has every other set of eight bits set to one, and so on doubling the number of set bits per group in each mask until the number of consecutive set bits is greater than or equal to one-half the length of the datum to be tested.

For simplicity, hereafter, an embodiment of the invention is described that operates on sixteen bit data values. However, the present invention is not limited to any particular data size.

Next, a shifted value is defined as indicated in block 22. The original data value that contains the bit being located may be compared to the original value shifted to the right by one. Then, in parallel, each mask is applied to the original value and compared to the shifted value as indicated in block 24. In other words, each mask is applied in turn to the value under question and compared to the original value shifted right by one in one embodiment.

If the mask value is greater than the shifted value, the corresponding predicate register 16 is set to one. Otherwise, the predicate register is set to zero. As shown in FIG. 2, the predicate registers 16 may be loaded with the appropriate values as indicated in block 26. After this has been done for each mask, the predicate registers 16 are moved into a single machine register by using a MOV instruction. The resulting value is the zero-based index of the most significant bit. The same approach may be utilized to find the least significant bit.

The following pseudocode may be utilized in an embodiment seeking the most significant bit of a sixteen bit value, producing the zero-based index of the highest non-zero bit (i.e., the leftmost bit):

```
/* Constants */
MaskHi8 = 0xFF00
MaskHi4 = 0xF0F0
MaskHi2 = 0xCCCC
MaskHi1 = 0xAAAA
shifted_value = original_value >> 1
/* Since there are no data dependencies between each
 * of the next four lines, they can each be executed
 * in parallel
 */
p4 = (MaskHi 8 & original value) > shifted_value
p3 = (MaskHi 4 & original value) > shifted_value
p2 = (MaskHi 2 & original value) > shifted_value
p1 = (MaskHi 1 & original value) > shifted_value
/* The line below may be a single instruction, a
'broadside' load of the predicate registers
 */
HighBitIndex = (p4 << 3) + (p3 << 2) + (p2 << 2) + (p1)
```

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

defining a plurality of masks;

receiving a datum and defining a shifted value of the datum;

applying each mask in parallel to the original datum value; and comparing the result to the shifted value.

2. The method of claim 1 wherein defining a plurality of masks includes defining a plurality of masks including a first mask having alternate bits set to one and a second mask having every other pair of bits set to one.

3. The method of claim 2 wherein defining a plurality of masks includes defining a third mask having every other group of four bits set to one and a fourth mask having other set of eight bits set to one.

4. The method of claim 3 including defining masks until the last mask has groups of bits that are greater than or equal to the number of bits in the datum under test.

5. The method of claim 1 wherein defining a shifted value includes shifting the datum by one.

6. The method of claim 5 wherein defining a shifted value includes shifting the original datum to the right by one.

7. The method of claim 1 wherein, if the result is greater than the shifted value, setting a register to one.

8. The method of claim 7 wherein, if the result is less than the shifted value, setting a register to zero.

9. The method of claim 1 including loading the result of said comparison into predicate registers.

10. The method of claim 9 including moving the results in said predicate registers to a single register.

11. An article comprising a medium storing instructions that, if executed, enable a processor-based system to perform the steps of:

defining a plurality of masks;

receiving a datum and defining a shifted value of the datum;

applying each mask in parallel to the original datum value; and comparing the result to the shifted value.

12. The article of claim 11 further storing instructions that, if executed, enable the system to perform the step of defining a plurality of masks including a first mask having alternate bits set to one and a second mask having every other pair of bits set to one.

13. The article of claim 12 further storing instructions that, if executed, enable the system to perform the step of defining a third mask having every other group of four bits set to one and a fourth mask having other set of eight bits set to one.

14. The article of claim 11 further storing instructions that, if executed, enable the system to perform the step of defining a shifted value that includes shifting the datum by one.

15. The article of claim 14 further storing instructions that, if executed, enable the system to perform the step of defining a shifted value that includes shifting the original datum to the right by one.

16. The article of claim 11 further storing instructions that, if executed, enable the system to perform the step of, if the result is greater than the shifted value, setting a register to one.

17. The article of claim 16 further storing instructions that, if executed, enable the system to perform the step of, if the result is less than the shifted value, setting a register to zero.

18. The article of claim 11 further storing instructions that, if executed, enable the system to perform the step of loading the result of said comparison into predicate registers.

19. The article of claim 18 further storing instructions that, if executed, enable the system to perform the step of moving the results in said predicate registers to a single register.

20. A system comprising:

a processor; and a storage coupled to said processor, said storage storing instructions that, if executed, enable the processor to perform the steps of:

defining a plurality of masks;

receiving a datum and defining a shifted value of the datum;

applying each mask in parallel to the original datum value; and comparing the result to the shifted value.

21. The system of claim 20 wherein said system includes a plurality of predicate registers, the result of said comparison being placed in said predicate registers.

* * * * *